Patented July 9, 1940

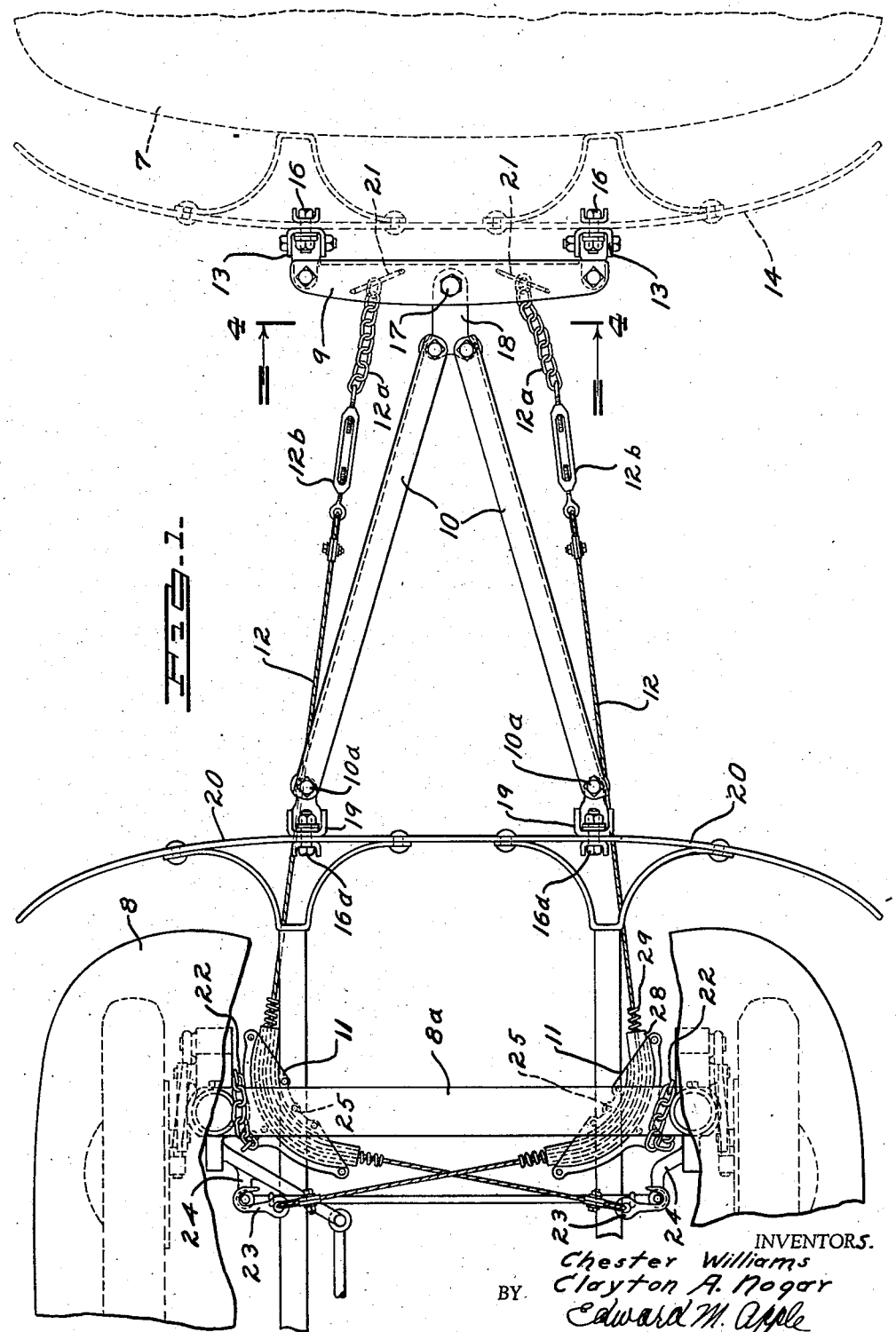

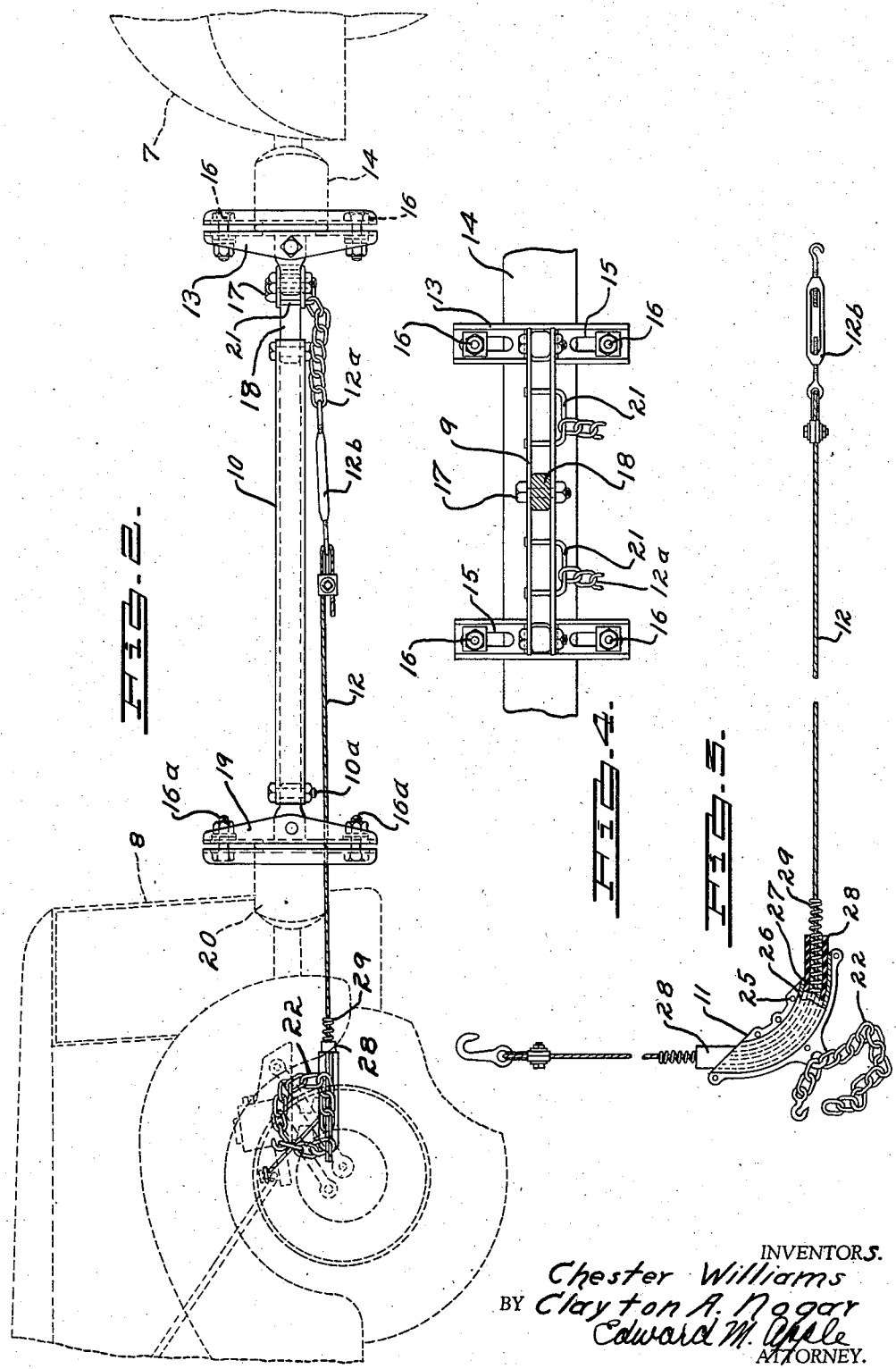

2,206,991

UNITED STATES PATENT OFFICE 2,206,991

AUTOMOBILE TOWING DEVICE

Chester Williams, Dearborn, and Clayton A. Nogar, Dundee, Mich.

Application September 7, 1938, Serial No. 228,828

2 Claims. (Cl. 280—33.55)

This invention relates to towing devices and has particular reference to a device for towing automobiles.

An object of the invention is to generally improve towing devices of the character referred to, and to provide a towing device, which overcomes many of the difficulties now encountered in the use of devices of this character.

An object of the invention is the provision of a device, which has universal application to all makes and types of automobiles and one which may be readily installed in a few minutes, without special equipment.

A further object of the invention is the provision of a towing device, which is provided with a positive steering mechanism, whereby the towed automobile is caused to track the towing automobile under all conditions.

A further object of the invention is the provision of a towing device, which is provided with self-equalizing steering mechanism.

Another object of the invention is the provision of a towing device, which permits the towed automobile to be backed as readily as the car having the motive force.

Further objects of the invention will appear as the description proceeds.

In some respects the device herein disclosed is similar to the device disclosed in our Patent No. 2,120,422, issued June 14, 1938, particularly with respect to the connection between the bumpers of the towed and towing automobiles.

We have found that under certain conditions, devices such as disclosed in our previous patent, permit the towed automobile to vary from the tracks of the towing automobile, particularly on slippery surfaces.

The foregoing difficulty and others are overcome and further advantages are effected in the use of our improved towing device.

In the accompanying drawings we have illustrated a preferred form of our device, in which drawings:

Fig. 1 is a top plan view of our device, illustrating the manner in which it is secured to the towed and towing automobiles.

Fig. 2 is a side elevation of the device illustrated in Fig. 1.

Fig. 3 is a detail, partly in section, illustrating the pulley and cable assembly.

Fig. 4 is a section taken on line 4—4 of Fig. 1.

Referring now more particularly to the drawings, it will be seen that in the embodiment herein disclosed, we have illustrated our improved towing device in operating position, between two automobiles, which are illustrated in part by dotted lines. The towing car being designated by the reference character 7 and the car being towed by the reference character 8.

It will be noted that our device consists broadly of a yoke 9, divergent arms 10, pullies 11, and cables 12. The yoke 9 is made in the form of a channel (Fig. 4) and is secured at either end to brackets 13, which are bolted as at 16 to the bumper 14, of the towing automobile. The brackets 13 are provided with slots 15, so that the tie bolts 16 may be adjusted to accommodate bumpers of different widths. Secured midway between the ends of the yoke 9, as at 17, is a link 18, to the end of which is pivotally secured the divergent arms 10, the opposite ends of which are pivoted as at 10a to the brackets 19, which in turn are secured by means of tie bolts 16a to the bumper 20 of the towed automobile 8.

The yoke 9 (Figs. 1 and 4) is provided with angularly positioned U members 21, which serve as fastening means for the chains 12a, which comprise part of the cable assembly 12 The U shaped members are intended to permit the cables to adjust themselves thereon when the cars are being turned, thereby equalizing the pull on the cables The cables are further provided with turn-buckles 12b, so that the length of the cables may be adjusted. It will be noted that the cables 12 extend through the pulley members 11, the latter being secured by means of chains 22, to the underside of the axle 8a at either end thereof. After passing through the pulley members 11, the cables 12 are secured by means of hooks 23 to the oppositely disposed spindle arms 24, which comprise part of the steering mechanism of the towed automobile 8.

As will be seen in Fig. 3, the pulley members consist of matched plates, which are bolted or riveted together as at 25. The plates are provided with arcuate grooves to form a tunnel 26, the latter being bushed with metal as at 27, and with rubber as at 28. A coil spring 29 extends longitudinally through the rubber bushing 28 and is adapted to receive the cable 12, which extends therethrough.

The operation of the device is simple. The yoke 9 and the divergent arms 10 insure the proper predetermined clearance between the towed and towing automobiles. The pulleys and cable assemblies insure the proper tracking of the towed automobile. When the towing automobile 7 makes a right hand turn, the left end of the yoke 9 will move relatively faster, thereby causing the left hand cable to exert a pull through the left hand pulley. This pull in turn is communicated to the right hand spindle arm of the towed automobile, causing the right front wheel of the towed automobile to move to the right. Inasmuch as the wheels are tied together the left front wheel will turn likewise. A left hand turn is made in the same manner, except that the forces will be reversed.

It is obvious that with a towing device, such as herein described, the towed automobile may be moved forward and backward with equal facility. This device also insures the proper tracking of the towed automobile in spite of the road surface conditions, inasmuch as the towing mechanism is positively connected to the steering mechanism of the towed automobile.

Having described our invention, what we claim and desire to secure by Letters Patent is:

1. In a towing device of the character described, including a yoke secured to the towing vehicle, rigid means extending from said yoke to the towed vehicle, and cables extending from said yoke to the steering mechanism of the towed vehicle, the combination of a matched pair of tunnel members for supporting and guiding said cables, each of said tunnel members comprising matched plates with arcuate grooves, said grooves having resilient means therein through which said cables are arranged to slide.

2. The combination defined in claim 1, wherein said tunnel members are provided with means to secure them, at opposite sides, to the chassis of the towed vehicle.

CHESTER WILLIAMS.
CLAYTON A. NOGAR.